United States Patent [19]
Taylor et al.

[11] Patent Number: 6,002,980
[45] Date of Patent: *Dec. 14, 1999

[54] SYSTEM AND METHOD FOR ENGINE CYLINDER POWER DIAGNOSIS BY CYLINDER(S) CUT-OFF SNAP THROTTLE ENGINE ACCELERATION TESTS

[75] Inventors: Dennis O. Taylor; Chuan He, both of Columbus, Ind.; Emma Sweetland, Bucks, United Kingdom; Albert E. Sisson, Columbus, Ind.; Yue Y. Wang, Columbus, Ind.; Eric K. Bradley, Columbus, Ind.; G. George Zhu, Columbus, Ind.; Steven G. Smith, Roseville, Minn.

[73] Assignee: Cummins Engine Company, Inc., Columbus, Ind.

[*] Notice: This patent issued on a continued prosecution application filed under 37 CFR 1.53(d), and is subject to the twenty year patent term provisions of 35 U.S.C. 154(a)(2).

[21] Appl. No.: 08/971,071

[22] Filed: Nov. 14, 1997

[51] Int. Cl.$^6$ .................................................. G01M 15/00
[52] U.S. Cl. ............................ 701/110; 73/116; 73/117.3; 123/436
[58] Field of Search ..................... 701/110, 111; 73/116, 117.2, 117.3, 118.1; 123/419, 436

[56] References Cited

U.S. PATENT DOCUMENTS

| | | | |
|---|---|---|---|
| Re. 23,150 | 9/1949 | Sexton | 73/116 |
| Re. 26,163 | 2/1967 | Heyer | 73/116 |
| Re. 31,656 | 9/1984 | Howes | 73/117.3 |
| 2,986,032 | 5/1961 | Heyer | 73/116 |
| 3,499,322 | 3/1970 | Pelta et al. | 73/116 |
| 3,572,103 | 3/1971 | Marino | 73/116 |
| 3,583,217 | 6/1971 | Howes | 73/116 |
| 3,636,703 | 1/1972 | Dileski | 58/146 |
| 3,788,129 | 1/1974 | Trussell | 73/116 |
| 3,839,907 | 10/1974 | Hanson et al. | 73/116 |
| 3,964,301 | 6/1976 | Hanson et al. | 73/116 |
| 3,994,160 | 11/1976 | Hanson | 73/116 |
| 4,295,363 | 10/1981 | Buck et al. | 73/117.3 |
| 4,302,815 | 11/1981 | Tedeschi et al. | 364/551 |
| 4,325,128 | 4/1982 | Abnett et al. | 73/116 |
| 4,348,893 | 9/1982 | Hendrix et al. | 73/116 |
| 4,398,259 | 8/1983 | Levine | 364/551 |
| 4,625,546 | 12/1986 | Sugo et al. | 73/116 |
| 5,113,830 | 5/1992 | Haines | 123/436 |
| 5,131,371 | 7/1992 | Wahl et al. | 123/436 |
| 5,189,907 | 3/1993 | Marino et al. | 73/116 |
| 5,477,827 | 12/1995 | Weisman, II et al. | 123/436 |
| 5,515,720 | 5/1996 | Remboski, Jr. et al. | 73/116 |
| 5,542,291 | 8/1996 | James | 73/117.3 |
| 5,544,058 | 8/1996 | Demizu et al. | 364/431.05 |
| 5,577,475 | 11/1996 | De Backer et al. | 123/417 |

*Primary Examiner*—George Dombroske
*Attorney, Agent, or Firm*—Woodard, Emhardt, Naughton Moriarty & McNett

[57] ABSTRACT

A system and method for measuring individual cylinder power contribution by cutting out individual cylinders of a multi-cylinder engine and performing a snap-throttle test on the engine. Engine speed versus time data is collected and stored during each snap-throttle test. This data is then used to calculate the power contribution provided by each cylinder using various methods, such as a least squares analysis of the speed data or by an analysis of the kinetic energy of the test engine.

9 Claims, 5 Drawing Sheets

SYSTEM AND METHOD FOR ENGINE CYLINDER POWER DIAGNOSIS BY CYLINDER(S) CUT-OFF SNAP THROTTLE ENGINE ACCELERATION TESTS

TECHNICAL FIELD OF THE INVENTION

The present invention generally relates to systems and methods for diagnosis of internal combustion engines and, more particularly, to a system and method for engine cylinder power diagnosis by cylinder(s) cut-off snap throttle engine acceleration tests.

BACKGROUND OF THE INVENTION

Manufacturers of internal combustion engines typically provide specifications indicating rated (target) power and/or torque outputs of the various manufactured engines over some specified engine speed range or ranges. At least for engines used in medium and heavy duty applications, such specifications are commonly provided as graphs or plots of engine output torque (wherein engine output torque is engine output power divided by engine speed) versus engine speed. An example of one such graph for a known Cummins M11 engine is illustrated in FIG. 1, wherein engine output torque 5 (in Newton-Meters) is plotted over an engine speed range of between 1100 and 1800 RPM.

Within the medium and heavy duty industry, one of the most common complaints from owners of such vehicles is low engine power. Heretofore, a typical technique for investigating such complaints utilized a known fault tree search technique to check all known possible causes of a low engine power condition. However, such a technique does not provide any way to determine or otherwise estimate the actual output power of the suspect engine. In cases where no cause for low engine power is found, the fault tree search techniques can, at best, provide an indication that the engine should have the rated power.

In another known prior art engine diagnostic method, a disabling action is derived from the engine at a rate proportional to the speed of the engine crankshaft and in a definite phase relation thereto, this disabling action being used to cause (by electronic means) any desired cylinder or cylinders or the engine to become inoperative. By selectively rendering any desired cylinder inoperative while the engine is still running, and without affecting the operation of the other cylinders, an analysis of the resulting engine performance enables ready determination of the relative power contribution of any particular cylinder. Fluctuations in the relative power of any particular cylinder may be caused by, for example, faulty air and/or fuel supply to the cylinder, leakage of combustion gases past the piston rings, etc. While this prior art method is capable of comparing the performance of one cylinder to any other cylinder within the engine, it also suffers from the drawback of not yielding a measure of the total engine output power which may be compared to the engine's rated power.

What is therefore needed is a system and method for diagnosing engine output power that quickly and efficiently narrows down possible causes for low engine power and further provides a simple and efficient technique for estimating actual engine output power over a desired engine speed range for comparison with rated engine output power specifications. Such a system would increase repair efficiency by reducing mis-diagnosis of engine output power related problems and by minimizing unnecessary parts replacement. The present invention is directed toward meeting this need.

SUMMARY OF THE INVENTION

Figure 1:
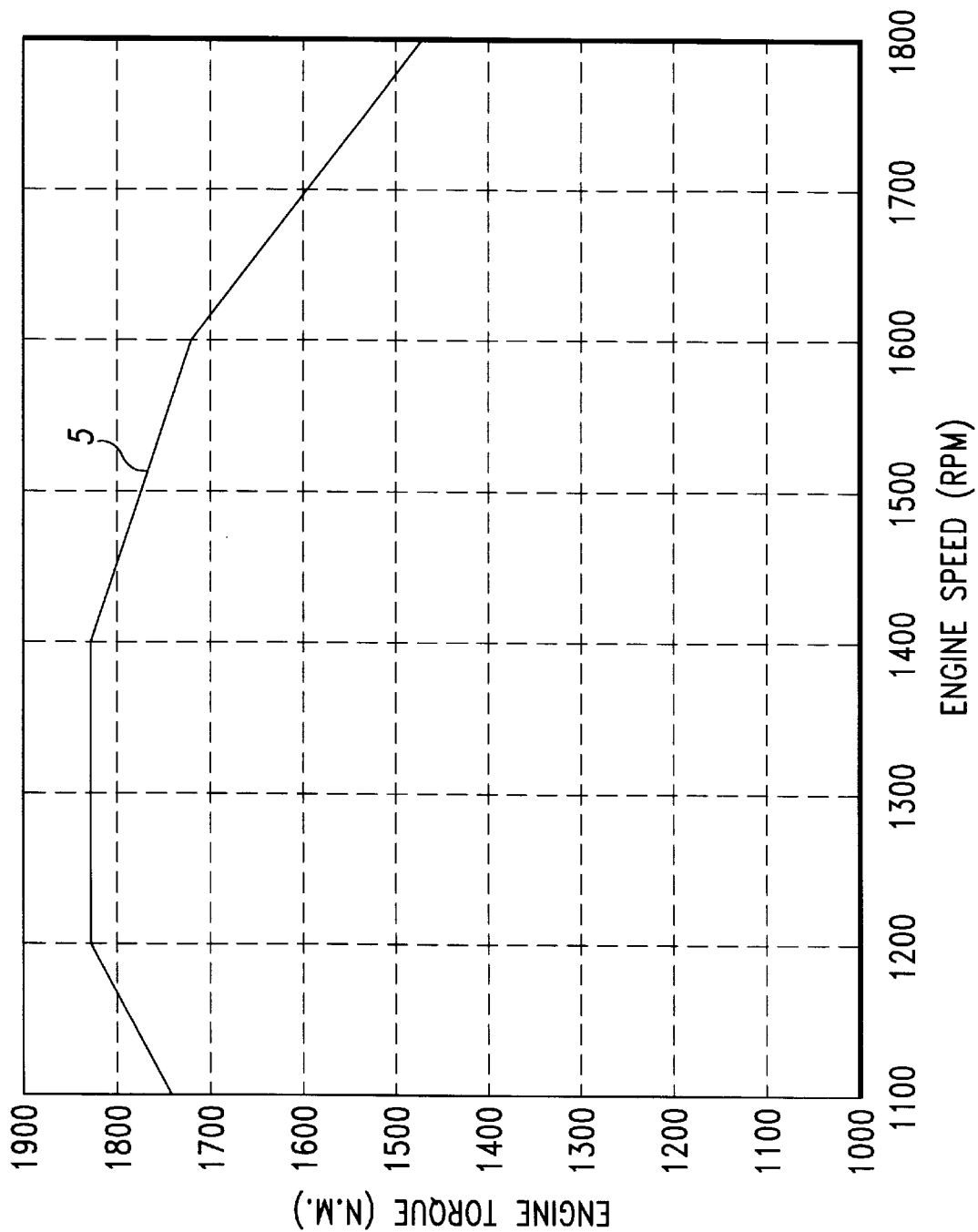
FIG. 1 is a prior art plot of rated engine output torque versus engine speed for a known heavy-duty truck engine.

The present invention relates to a system and method for measuring individual cylinder power contribution by cutting out individual cylinders of a multi-cylinder engine and performing a snap-throttle test on the engine. Engine speed versus time data is collected and stored during each snap-throttle test. This data is then used to calculate the power contribution provided by each cylinder using various methods, such as a least squares analysis of the speed data or by an analysis of the kinetic energy of the test engine.

In one form of the invention, a method for engine cylinder power diagnosis of an internal combustion engine having a plurality of cylinders is disclosed, comprising the steps of a) determining an engine test matrix; b) cutting off at least one of the plurality of cylinders in accordance with the test matrix; c) performing a snap throttle test upon the engine; d) recording engine speed vs. time data from the engine during the snap throttle test; e) repeating steps (b)–(d) for all tests required by the test matrix; and f) calculating a power contribution of each of the plurality of cylinders using the data recorded in step (d).

DETAILED DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Figure 2:
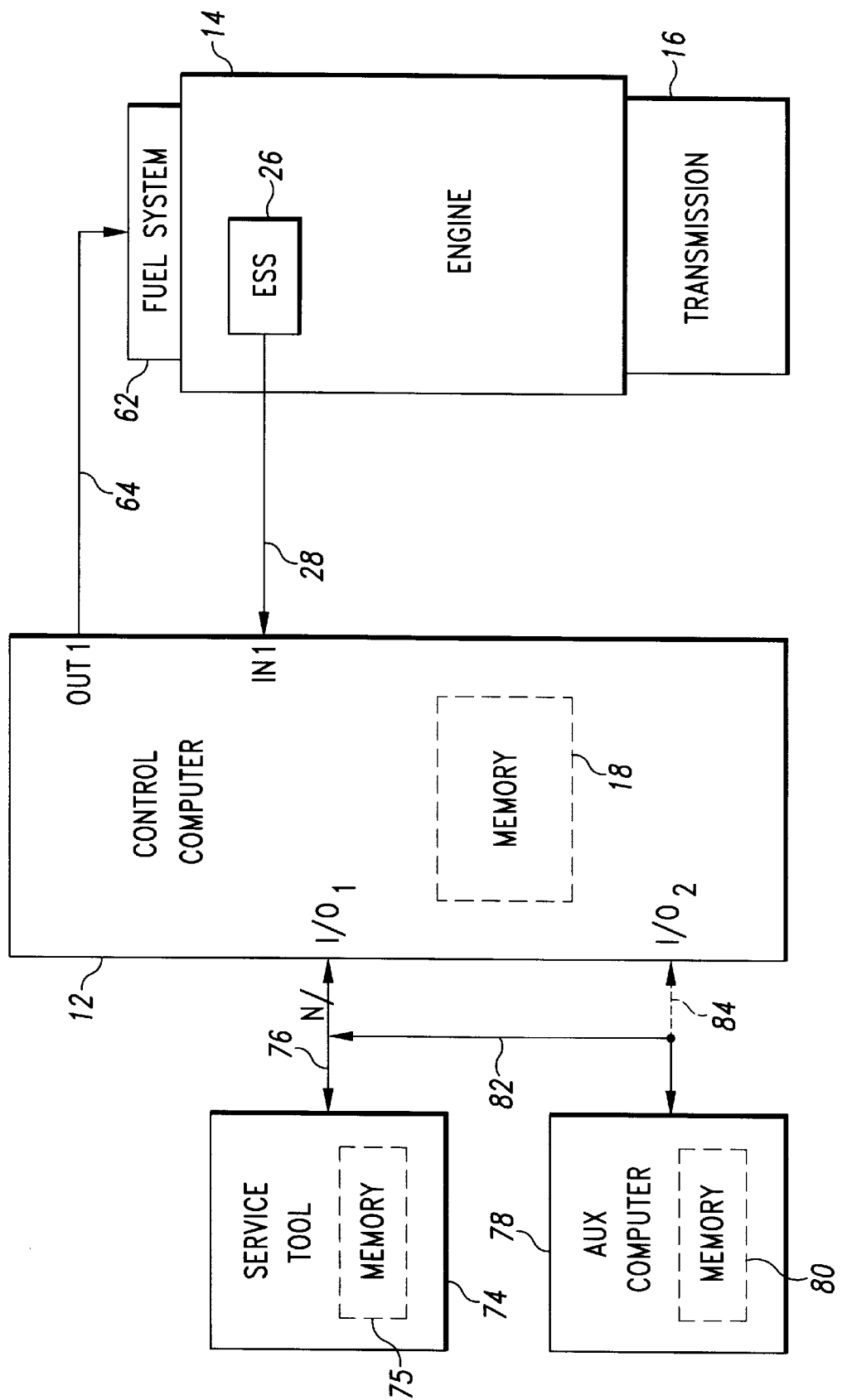
FIG. 2 is a diagrammatic illustration of a system for diagnosing low engine output power, in accordance with the present invention.

Referring now to FIG. 2, a system 10 for diagnosing low engine output power, in accordance with the present invention, is shown. System 10 includes a control computer 12, which is operable to control an engine 14 and a transmission 16 connected thereto, as is known in the art. Control computer 12 is often referred to as an engine control module (ECM), engine control unit (ECU) or the like, is preferably microprocessor-based and includes a memory unit 18. Control computer 12 is operable, as is notoriously well known in the art, to control and manage many vehicular operations, such as those associated with the operation of the engine 14 and transmission 16, in accordance with software algorithms and operational data typically stored within memory unit 18.

Many engine/vehicle sensors, switches and other vehicle/engine components interface with control computer 12 during the operation thereof, and some examples of such components, as they relate to the present invention, are illustrated in FIG. 2. For example, the engine 14 is preferably an internal combustion engine and includes an engine speed sensor (ESS) 26 associated therewith which is electrically connected to input IN1 of control computer 12 via signal path 28. The engine speed sensor (ESS) 26 is operable to sense engine rotational speed (typically in RPMs) and/or engine position (typically in degrees relative to TDC), and provide an engine speed signal corresponding thereto on signal path 28. In one embodiment, engine speed sensor 26 is a HALL effect sensor responsive to passage thereby of a number of teeth of a gear or wheel rotating in synchronism with the engine 14 to provide the engine speed signal on signal path 28. Those skilled in the art will, however, appreciate that engine speed sensor 26 may alternatively be a variable reluctance or other known sensor operable to sense engine speed and/or position and provide a corresponding engine speed signal.

Control computer 12 includes an output OUT1 electrically connected to a fuel system 62, associated with the engine 14, via signal path 64. Fuel system 62 may be any known fuel system including one or more fuel injectors, etc. (not shown), and is responsive to fuel control signals provided thereto by control computer 12 on signal path 64 to fuel the engine 14 accordingly.

System 10 further includes a known service tool 74, which is typically computer-controlled and has a memory portion 75, and which is electrically connected to inout/output port I/O$_1$ of control computer 12 via a number, N, of signal paths 76, wherein N may be any integer. In one embodiment, signal paths 76 make up a known 2-wire serial data link which is preferably configured and operates in accordance with the Society of Automotive Engineers (SAE) J1587 standards. In accordance with the J1587 standards, information relating to various engine and vehicle operating parameters is continuously broadcast onto the data link 76 in real-time. Examples of such information include, but are not limited to, engine speed, vehicle speed, engine load, % throttle (accelerator pedal position), and the like. Moreover, control computer 12 is operable to import data from any suitable source, such as a computer-controlled service tool 74 or other auxiliary computer, connected to the data link 76. Also provided is an auxiliary computer 78, having a memory portion 80 that is preferably connectable to the data link 76 via signal path 82. Alternatively, auxiliary computer 78 may be connected to a second serial port/output port I/O$_2$ of control computer 12 for communicating therewith via signal path 84.

In accordance with a preferred embodiment of the present invention, many of the computer executable portions of the software algorithms for diagnosing engine power, which will be discussed in greater detail hereinafter, are executed by either the service tool 74 (via software stored in memory 75) or the auxiliary computer 78 (via software stored in memory 80). Those skilled in the art will, however, recognize that control computer 12 may alternatively be configured to execute such algorithms (via software stored in memory 18), wherein any results of such computations may be downloaded in a known manner via service tool 74 or auxiliary computer 78.

Figure 3:
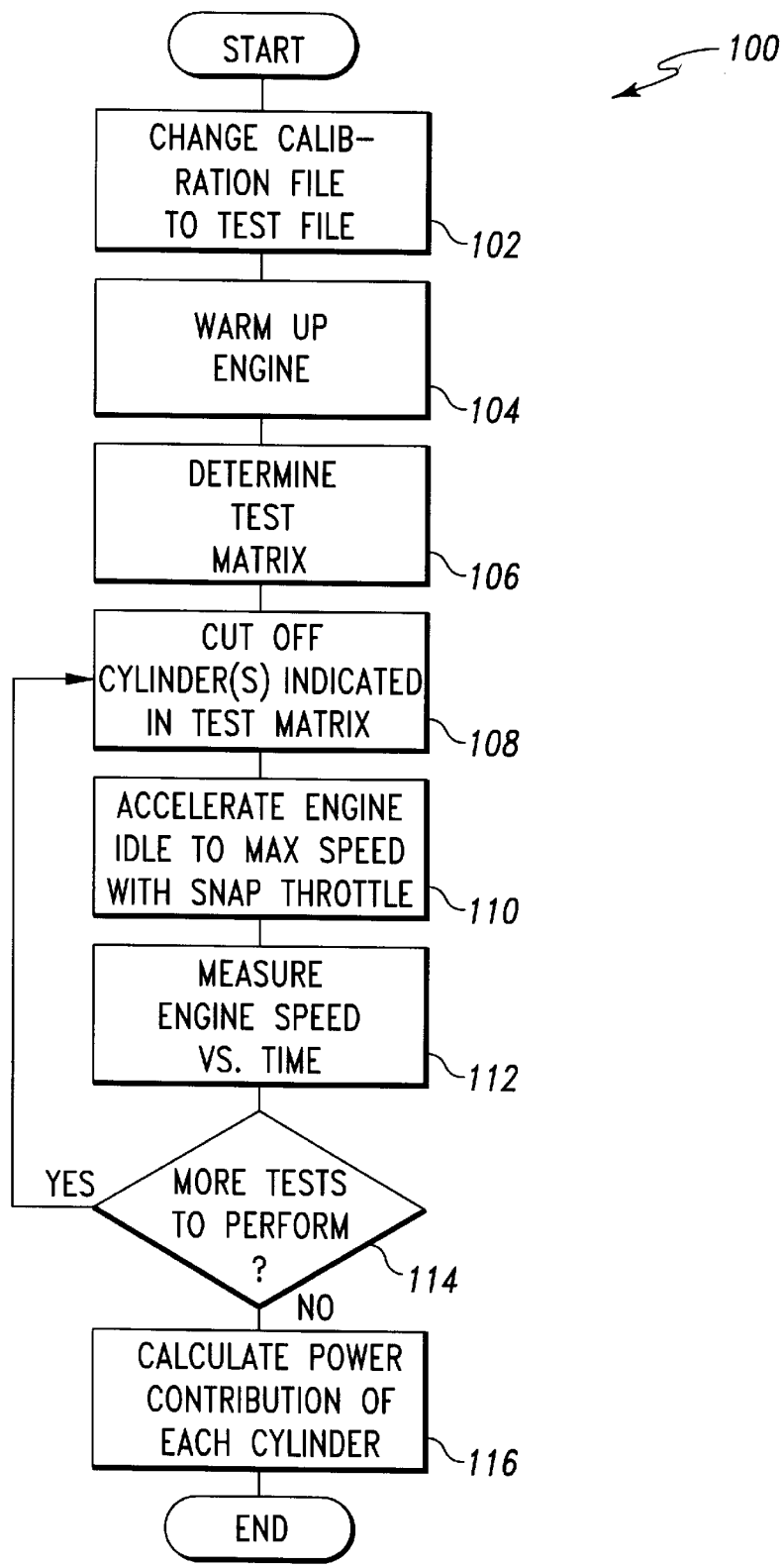
FIG. 3 is a schematic process diagram illustrating a software algorithm, executable by the system of FIG. 2, for diagnosing low engine output power in accordance with one aspect of the present invention.

Referring now to FIG. 3, there is illustrated a flow chart of a preferred embodiment algorithm of the present invention for measuring engine power contribution by each cylinder, indicated generally at 100. The process 100 begins at step 102 in which the calibration file for the engine 14, which is stored in memory 18 of control computer 12, is changed to a specially designed test file. The test file is designed to eliminate the influence of air/fuel ratio and to take into account the friction torque of the engine 14 in order to make the measured speed curve more linear. The influence of air/fuel ratio is eliminated by setting the maximum commandable fuel supply level equal to ninety percent (90%) of that allowed by the normal calibration tables at any engine speed for zero turbocharger boost pressure (if the engine is turbocharged). The reason for limiting the fuel to ninety percent (90%) of that allowed by the calibration tables is to avoid the influence of differences in air flow between cylinders caused by design factors.

The process then continues at step 104, in which the engine is warmed to normal operating conditions by running the engine. The cooling system fan is then operated and the engine is run until the engine condition stabilizes.

In the test of the present invention, test data is taken on the running engine 14 after different cylinders of the engine 14 have been disabled in a predetermined pattern. For example, Table 1 illustrates a sequence of six tests which may be conducted upon a six cylinder engine, wherein a "0" represents a cylinder that is cut-off, and a "1" represents a cylinder that is operational. The operation of the cylinder may be cut-off by any convenient means, such as by shutting off fuel to the designated cylinder in a diesel engine.

TABLE 1

| Cylinder | 1 | 2 | 3 | 4 | 5 | 6 |
|---|---|---|---|---|---|---|
| Test 1: | 0 | 1 | 1 | 1 | 1 | 1 |
| Test 2: | 1 | 0 | 1 | 1 | 1 | 1 |
| Test 3: | 1 | 1 | 0 | 1 | 1 | 1 |
| Test 4: | 1 | 1 | 1 | 0 | 1 | 1 |
| Test 5: | 1 | 1 | 1 | 1 | 0 | 1 |
| Test 6: | 1 | 1 | 1 | 1 | 1 | 0 |

The test procedure of the present invention may be run with one or more cylinders of the engine cut-off during each test. If the test engine has eight or more cylinders, it is preferable to cut-off half of the cylinders before performing the test of the present invention on the remaining cylinders. After the test of the present invention has been done for each half of the engine, the results can be combined. If there are sixteen or more cylinders, it may be desirable to divide the test of the present invention into three or more parts.

The test procedure of the present invention will use various test patterns in Table 1, with one or more cylinders of the engine 14 cut-off in differing combinations. The only requirement in the ordering of cylinder cut-offs in the various tests is that the matrix representing the test pattern must be invertible. This is due to the requirement that the matrix be inverted during calculations described hereinbelow. For the test pattern of Table 1, the appropriate test matrix would be as follows:

$$A = \begin{bmatrix} 0 & 1 & 1 & 1 & 1 & 1 \\ 1 & 0 & 1 & 1 & 1 & 1 \\ 1 & 1 & 0 & 1 & 1 & 1 \\ 1 & 1 & 1 & 0 & 1 & 1 \\ 1 & 1 & 1 & 1 & 0 & 1 \\ 1 & 1 & 1 & 1 & 1 & 0 \end{bmatrix}$$

This matrix is determined at step 106 of the process 100. In the above example, the matrix A is invertible in that $A^{-1}$ exists.

The process 100 continues at step 108 in which various cylinder(s) of the engine 14 are cut-off as indicated in the test matrix A. In the exemplary system 10 of FIG. 2, cutting off of the cylinder(s) is accomplished by commanding the fuel system 62, via line 64, to interrupt the supply of fuel to the appropriate cylinder(s). At step 110, a snap throttle test is performed upon the engine 14 with the appropriate cylinder(s) cut-out. The snap throttle test involves accelerating the engine 14 from idle speed to maximum speed by electronically increasing the throttle signal from 0 to 100% nearly instantaneously. During the snap throttle test, measurements of engine speed versus time are continuously taken, per step 112. These measurements are made by reading the engine speed signal generated by engine speed sensor 26 and broadcast onto line 28. This data is gathered for the duration of the snap throttle test.

After performing the snap throttle test and recording the data at step 112, step 114 determines if there are any more tests to be performed per the matrix A. If so, the process loops to step 108, and the next step is performed. If not, the process continues to step 116 in which the test data taken at step 112 is used to calculate the power contribution provided by each cylinder of the engine 14.

Figure 4:
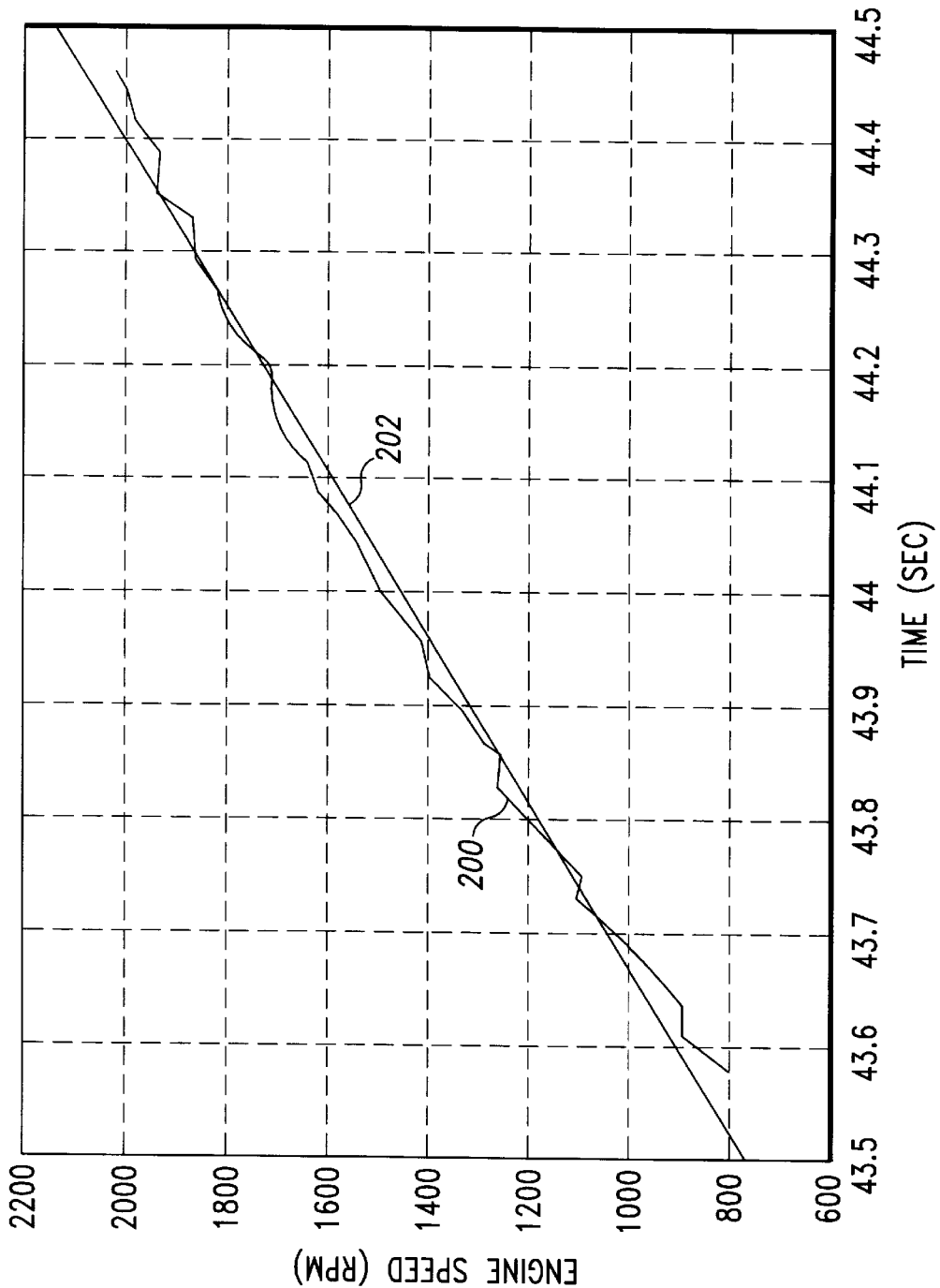
FIG. 4 is a plot of engine speed versus time, illustrating a portion of one aspect of the present invention.

In a first embodiment power contribution calculation of the present invention, the fact that measured engine speed versus time is a nearly linear relation is used to calculate the power contribution of each cylinder. Because of the nearly linear relationship between engine speed and time, the least squares (linear regression) method or other suitable method can easily be used to calculate the average acceleration of the engine during each test. With reference to FIG. 4, the plot 200 represents actual measurement data of engine speed versus time recorded at step 112 for one of the tests in the test matrix A. The straight line 202 is a least squares linearization line showing the best fit of a linear line to the test data 200. The slope of the line 202 is therefore the average acceleration of the engine 14 during the snap throttle test. The average acceleration rate a is given by:

$$a = dV_{eng}/dt$$

From Newton's second law, $$\Sigma F = ma$$

The engine force is therefore proportional to the engine acceleration rate. Therefore, for a six cylinder engine, the following relation exists:

$$A \begin{bmatrix} F_1 \\ F_2 \\ F_3 \\ F_4 \\ F_5 \\ F_5 \end{bmatrix} = m \begin{bmatrix} a_1 \\ a_2 \\ a_3 \\ a_4 \\ a_5 \\ a_5 \end{bmatrix}$$

Where A is the invertible test pattern matrix, $F_i$ is the force produced by the $i^{th}$ cylinder, $a_i$ is the acceleration rate from the $i^{th}$ test described in the test matrix A, and m is the total engine 14 system rotational mass. As can be seen from the above equation, the force $F_i$ (and hence the power) contributed by any particular cylinder of the engine 14 may be calculated. Furthermore, if it is desired to determine the relative power balance between cylinders in the engine 14, the relative power of each cylinder can be calculated by:

$$C_i = \frac{F_i}{F_1 + F_2 + F_3 + F_4 + F_5 + F_6}$$

Figure 5:
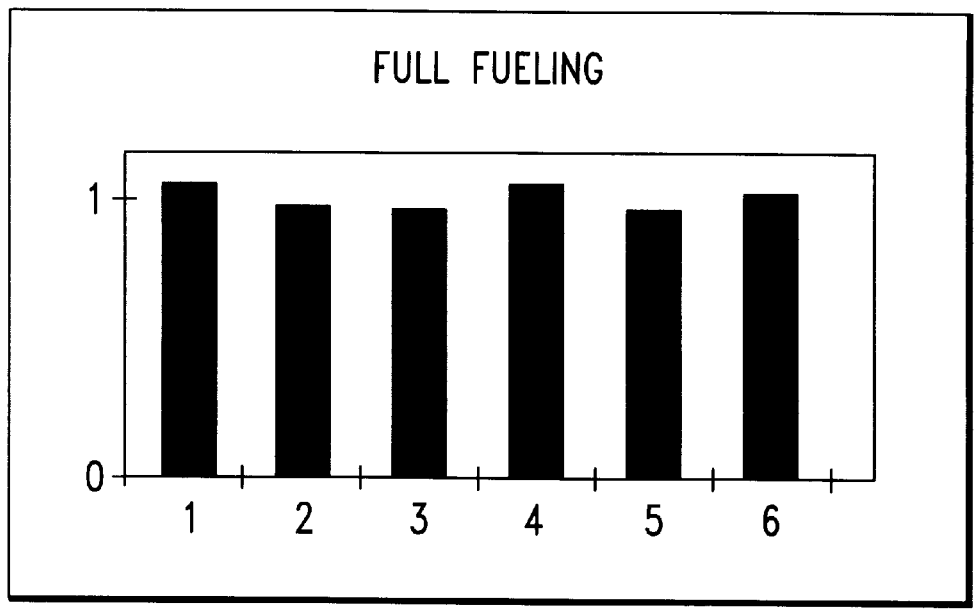
FIG. 5 is a graph of cylinder output power versus cylinder number for an engine that is fully fueled.
Figure 6:
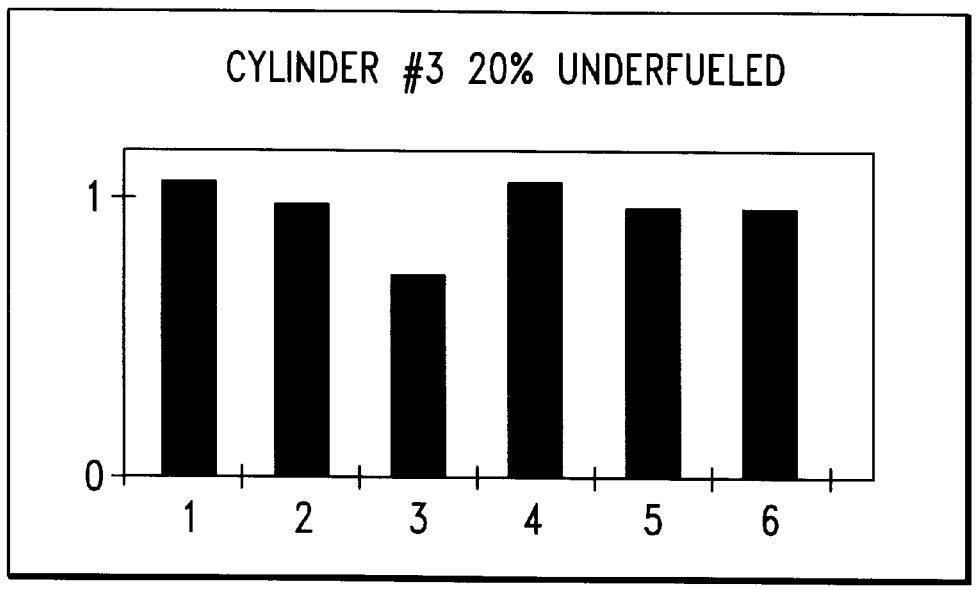
FIG. 6 is a graph of cylinder output power versus cylinder number, wherein Cylinder No. 3 is twenty percent (20%) underfueled.

FIG. 5 illustrates the power contribution of each cylinder in a six cylinder engine when each of the cylinders is fully fueled, as measured by the snap throttle test of the present invention. FIG. 6 illustrates the power contribution of each cylinder in a six cylinder engine when Cylinder No. 3 is under fueled by twenty percent (20%), as measured by the snap throttle test of the present invention. It can readily be seen from this data that the tests of the present invention will easily detect problems with cylinder fueling, cylinder compression, and other factors contributing to the total power produced by each cylinder.

In some engines, such as some diesel engines, gasoline and natural gas engines, the least squares method of the first embodiment test procedure detailed above is not suitable due to the large speed range of such engines and the non-linearity of the speed versus time curve for these engines. A second embodiment of the present invention allows calculation of cylinder power contribution in step 116 of the process 100 where the non-linearity of the speed versus time curve has no influence on the accuracy of the results. Therefore, the second embodiment of the present invention may be used for any kind of engine which has the ability to cut-off individual cylinders. The second embodiment method of the present invention utilizes an energy method in order to calculate cylinder power distribution. In order to detect the average effective power level of each test in the test matrix A, it is necessary to realize that the effective energy is the energy converted to kinetic energy of the test engine 14 rotational parts. Therefore, the effective energy of the snap throttle test can be calculated by:

$$W = \frac{1}{2} I \omega_1^2 - \frac{1}{2} I \omega_0^2$$
$$= \frac{1}{2} I \left[ \left( \frac{\pi n_1}{30} \right)^2 - \left( \frac{\pi n_0}{30} \right)^2 \right]$$
$$= \frac{\pi^2 I}{1800} (n_1^2 - n_0^2)$$

Where W is the total effective work done by the engine 14 at snap throttle, which will be a constant when the same reference start speed $n_0$ and end speed $n_1$ is used for each snap throttle test. It will be appreciated by those having ordinary skill in the art that, in order to eliminate transient effects, the snap throttle test begins at a speed below $n_0$ and ends at a speed above $n_1$, but only data relating to the speed range $n_0$–$n_1$ is used to calculate W. I is the total rotational inertia of the engine 14. Hence, the average engine 14 effective power of each test in the test matrix A is given by:

$$P_i = \frac{W}{T_i}$$

Where $T_i$ is the time elapsed for the $i^{th}$ snap throttle test to accelerate the engine 14 speed from $n_0$ to $n_1$. With some matrix manipulation, the above information can be used to find the relative cylinder power:

$$A \begin{bmatrix} D_1 \\ D_2 \\ D_3 \\ D_4 \\ D_5 \\ D_6 \end{bmatrix} = \begin{bmatrix} P_1 \\ P_2 \\ P_3 \\ P_4 \\ P_5 \\ P_6 \end{bmatrix} = \begin{bmatrix} W/T_1 \\ W/T_2 \\ W/T_3 \\ W/T_4 \\ W/T_5 \\ W/T_6 \end{bmatrix}$$

Where A is the invertible test pattern matrix, $D_i$ is the average effective power produced by the $i^{th}$ cylinder of the engine 14, and $P_j$ is the average effective engine power produced in the $i^{th}$ test. From the above equation, one can get:

$$\begin{bmatrix} D_1 \\ D_2 \\ D_3 \\ D_4 \\ D_5 \\ D_6 \end{bmatrix} = WA^{-1} \begin{bmatrix} 1/T_1 \\ 1/T_2 \\ 1/T_3 \\ 1/T_4 \\ 1/T_5 \\ 1/T_6 \end{bmatrix}$$

Therefore, it is possible to calculate the average effective power produced by each cylinder using the second embodiment test procedure of the present invention. Alternatively, the relative power produced by each cylinder in relation to the other cylinders can be calculated by:

$$C_i = \frac{D_i}{D_1 + D_2 + D_3 + D_4 + D_5 + D_6}$$

It will be appreciated by those having ordinary skill in the art that the first and second embodiment test methods described hereinabove allow the power contribution of each cylinder in a multi-cylinder engine to be determined fairly easily. The entire test may be run by, for example, the service tool 75 computer from an algorithm stored to the memory 74. The entire test can be run automatically, and the service tool 75 can also automatically calculate the cylinder power data based upon the measurement results. The system and methods of the present invention therefore represent a significant improvement over the prior art.

Furthermore, the system and methods of the present invention may be combined with other test methods as part of a comprehensive engine power test program. One such other test method is described in a U.S. patent application entitled, "System and Method for Diagnosing Output Power of an Internal Combustion Engine" by He et al., filed on even date herewith.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed:

1. A method for engine cylinder power diagnosis of an internal combustion engine having a plurality of cylinders, comprising the steps of:
   a) determining an engine test matrix;
   b) cutting off at least one of the plurality of cylinders in accordance with the test matrix;
   c) performing a snap throttle test upon the engine;
   d) recording engine speed vs. time data from the engine during the snap throttle test;
   e) repeating steps (b)–(d) for all tests required by the test matrix; and
   f) calculating a power contribution of each of the plurality of cylinders using the data recorded in step (d).

2. The method of claim 1, wherein the engine test matrix is invertible.

3. The method of claim 1, wherein step (b) comprises cutting off a fuel supply to the at least one cylinder.

4. The method of claim 1, further comprising the steps of:
   g) cutting off one-half of the plurality of cylinders;
   h) performing steps (a)–(e) using another half of the plurality of cylinders;
   i) cutting off said another half of the plurality of cylinders;
   j) performing steps (a)–(e) using said one half of the plurality of cylinders; and
   k) performing step (f).

5. The method of claim 1, wherein step (c) comprises accelerating the engine from substantially idle speed to substantially maximum speed by increasing from substantially zero percent throttle to substantially one hundred percent throttle substantially instantaneously.

6. The method of claim 1, wherein step (c) comprises accelerating the engine from a first speed $n_0$ to a second speed $n_1$ while applying substantially one hundred percent throttle.

7. The method of claim 1, wherein step (f) comprises calculating a relative power contribution of each of the plurality of cylinders.

8. The method of claim 1, wherein step (f) further comprises the steps of:
   f.1) calculating an average acceleration rate of the engine during each snap throttle test by determining a slope of a straight line fit to the data recorded in step (d); and
   f.2) calculating a power contribution of each of the plurality of cylinders by:

$$\begin{bmatrix} F_1 \\ F_2 \\ F_3 \\ \vdots \\ F_i \end{bmatrix} = A^{-1} m \begin{bmatrix} a_1 \\ a_2 \\ a_3 \\ \vdots \\ a_i \end{bmatrix}$$

where
$F_i$ is a force produced by an $i^{th}$ cylinder,
A is the test matrix,
m is a total engine system rotational mass, and
$a_i$ is the average acceleration rate from an $i^{th}$ snap throttle test as calculated in step (f.1).

9. The method of claim 1, wherein step (f) further comprises accelerating the engine from a first speed $n_0$ to a second speed $n_1$ while applying substantially one hundred percent throttle and step (f) further comprises calculating a power contribution of each of the plurality of cylinders by:

$$\begin{bmatrix} D_1 \\ D_2 \\ D_3 \\ \vdots \\ D_i \end{bmatrix} = WA^{-1} \begin{bmatrix} 1/T_1 \\ 1/T_2 \\ 1/T_3 \\ \vdots \\ 1/T_i \end{bmatrix}$$

where
$D_i$ is an average effective power produced by an $i^{th}$ cylinder,

W is a total effective work done by the engine during each snap throttle test,

A is the test matrix, and $T_i$ is an elapsed time to accelerate from $n_0$ to $n_1$ during the $i^{th}$ snap throttle test.

* * * * *

UNITED STATES PATENT AND TRADEMARK OFFICE
CERTIFICATE OF CORRECTION

PATENT NO. : 6,002,980
DATED : December 14, 1999
INVENTOR(S) : Dennis O. Taylor, et. al.

It is certified that error appears in the above-identified patent and that said Letters Patent is hereby corrected as shown below:

Column 4, line 48, insert , such as that shown--.

Signed and Sealed this

Fourteenth Day of November, 2000

Attest:

Q. TODD DICKINSON

*Attesting Officer*     *Director of Patents and Trademarks*